United States Patent
Shi et al.

(10) Patent No.: US 11,460,674 B2
(45) Date of Patent: Oct. 4, 2022

(54) CAMERA OPTICAL LENS INCLUDING FIVE LENSES OF +--+- REFRACTIVE POWERS

(71) Applicant: AAC Optics Solutions Pte. Ltd., Singapore (SG)

(72) Inventors: Rongbao Shi, Shenzhen (CN); Wen Sun, Shenzhen (CN); Hiroyuki Teraoka, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 294 days.

(21) Appl. No.: 16/936,450

(22) Filed: Jul. 23, 2020

(65) Prior Publication Data
US 2021/0055518 A1    Feb. 25, 2021

(30) Foreign Application Priority Data

Aug. 19, 2019   (CN) .......................... 201910765627.9

(51) Int. Cl.
*G02B 13/00*    (2006.01)
*G02B 9/60*    (2006.01)

(52) U.S. Cl.
CPC ........... *G02B 13/0045* (2013.01); *G02B 9/60* (2013.01)

(58) Field of Classification Search
CPC .............................. G02B 13/0045; G02B 9/60
See application file for complete search history.

(56) References Cited

U.S. PATENT DOCUMENTS 10,101,561 B2 * 10/2018 Tsai ................... G02B 13/0045

* cited by examiner

*Primary Examiner* — Wen Huang
(74) *Attorney, Agent, or Firm* — W&G Law Group (57) ABSTRACT

A camera optical lens is provided, including five lenses, which satisfies the following conditions: $0.60 \leq (R3+R4)/(R3-R4) \leq 0.7$; $-5.00 \leq (R5+R6)/(R5-R6) \leq -4.20$; $1.10 \leq d8/d9 \leq 1.20$; and $0.85 \leq (R9+R10)/(R9-R10) \leq 0.89$; where R3 denotes a curvature radius of an object-side surface of the second lens; R4 denotes a curvature radius of an image-side surface of the second lens; R5 denotes a curvature radius of an object-side surface of the third lens; R6 denotes a curvature radius of an image-side surface of the third lens; R9 denotes a curvature radius of an object-side surface of the fifth lens; R10 denotes a curvature radius of an image-side surface of the fifth lens; d8 denotes an on-axis distance from an image-side surface of the fourth lens to an object-side surface of the fifth lens; d9 denotes an on-axis thickness of the fifth lens. The camera optical lens satisfies a design requirement of a large aperture, ultra-thinness and a wide angle while having good optical functions.

10 Claims, 9 Drawing Sheets

CAMERA OPTICAL LENS INCLUDING FIVE LENSES OF +--+- REFRACTIVE POWERS

TECHNICAL FIELD

The present disclosure relates to optical lens, in particular, to a camera optical lens suitable for handheld devices, such as smart phones and digital cameras, and imaging devices, such as monitors or PC lenses.

BACKGROUND

In recent years, with the rise of smart phones, the need for miniaturized camera lenses are increasing, and the photosensitive devices of general camera lenses are charge coupled device (CCD) or complementary metal oxide semiconductor sensors (CMOS Sensor). Due to the advancement of semiconductor manufacturing process technology, the pixel size of the photosensitive devices has reduced. As the current development trend of electronic products goes towards better functions and thinner and smaller dimensions, miniature camera lenses with good imaging quality is becoming a mainstream in the market.

In order to obtain better imaging quality, a mini-lens that is traditionally equipped in a mobile phone camera adopts a three-piece or a four-piece lens structure. However, with the development of technology and the increase of users' diversified needs, the pixel size of the photosensitive device continues to reduce, and the system's imaging quality requirements continue to increase, therefore, the five-piece lens structure gradually appears in the lens design. Although a five-piece lens has good optical functions, the lens is fairly unreasonable in terms of setting of optical power, lens spacing, and lens shape, rendering that the lens structure with good optical functions cannot satisfy a design requirement of a large aperture, ultra-thinness and a wide angle.

SUMMARY

To address the above issues, the present disclosure seeks to provide a camera optical lens that satisfies a design requirement of a large aperture, ultra-thinness and a wide angle while having good optical functions.

To solve the above technical problem, embodiments of the present disclosure provide a camera optical lens, which includes, from an object side to an image side in sequence: a first lens having a positive refractive power; a second lens having a negative refractive power; a third lens having a negative refractive power; a fourth lens having a positive refractive power; a fifth lens having a negative refractive power; wherein the camera optical lens satisfies following conditions:

$0.60 \leq (R3+R4)/(R3-R4) \leq 0.7$;

$-5.00 \leq (R5+R6)/(R5-R6) \leq -4.20$;

$0.85 \leq (R9+R10)/(R9-R10) \leq 0.89$; and $1.10 \leq d8/d9 \leq 1.20$;

where R3 denotes a curvature radius of an object-side surface of the second lens; R4 denotes a curvature radius of an image-side surface of the second lens; R5 denotes a curvature radius of an object-side surface of the third lens; R6 denotes a curvature radius of an image-side surface of the third lens; R9 denotes a curvature radius of an object-side surface of the fifth lens; R10 denotes a curvature radius of an image-side surface of the fifth lens; d8 denotes an on-axis distance from an image-side surface of the fourth lens to an object-side surface of the fifth lens; d9 denotes an on-axis thickness of the fifth lens.

As an improvement, the camera optical lens further satisfies the following condition:

$-5.60 \leq R3/R4 \leq -4.00$.

As an improvement, the camera optical lens further satisfies the following condition:

$-11.00 \leq f3/f \leq -9.00$;

where f3 denotes a focal length of the third lens, f denotes a focal length of the camera optical lens.

As an improvement, the camera optical lens further satisfies the following condition:

$0.40 \leq f1/f \leq 1.36$;

$-3.26 \leq (R1+R2)/(R1-R2) \leq -0.89$; and $0.08 \leq d1/TTL \leq 0.25$;

where f1 denotes a focal length of the first lens, f denotes a focal length of the camera optical lens, R1 denotes a curvature radius of an object-side surface of the first lens, R2 denotes a curvature radius of an image-side surface of the first lens, d1 denotes an on-axis thickness of the first lens, and TTL denotes a total optical length from an object-side surface of the first lens to an image surface of the camera optical lens along an optical axis.

As an improvement, the camera optical lens further satisfies the following conditions:

$-6.05 \leq f2/f \leq -1.42$; and $0.02 \leq d3/TTL \leq 0.08$;

where f2 denotes a focal length of the second lens, f denotes a focal length of the camera optical lens, d3 denotes an on-axis thickness of the second lens, and TTL denotes a total optical length from an object-side surface of the first lens to an image surface of the camera optical lens along an optical axis.

As an improvement, the camera optical lens further satisfies the following conditions:

$0.03 \leq d5/TTL \leq 0.10$;

where d5 denotes an on-axis thickness of the third lens, and TTL denotes a total optical length from an object-side surface of the first lens to an image surface of the camera optical lens along an optical axis.

As an improvement, the camera optical lens further satisfies the following conditions:

$0.34 \leq f4/f \leq 1.06$;

$0.63 \leq (R7+R8)/(R7-R8) \leq 2.11$; and $0.07 \leq d7/TTL \leq 0.27$;

where f4 denotes a focal length of the fourth lens, f denotes a focal length of the camera optical lens, R7 denotes a curvature radius of an object-side surface of the fourth lens, R8 denotes a curvature radius of an image-side surface of the fourth lens, d7 denotes an on-axis thickness of the fourth lens, and TTL denotes a total optical length from an object-side surface of the first lens to an image surface of the camera optical lens along an optical axis.

As an improvement, the camera optical lens further satisfies the following conditions:

$$-1.22 \le f5/f \le -0.39;\text{ and}$$

$$0.03 \le d9/TTL \le 0.11;$$

where f5 denotes a focal length of the fifth lens, f denotes a focal length of the camera optical lens, and TTL denotes a total optical length from an object-side surface of the first lens to an image surface of the camera optical lens along an optical axis.

As an improvement, the camera optical lens further satisfies the following condition:

$$TTL/IH \le 1.46;$$

where TTL denotes a total optical length from an object-side surface of the first lens to an image surface of the camera optical lens along an optical axis, IH denotes an image height of the camera optical lens.

As an improvement, the camera optical lens further satisfies the following condition:

$$FNO \le 1.66;$$

where FNO denotes an F number of the camera optical lens.

The present disclosure is advantageous in: through the above lens configuration, the camera optical lens in the present disclosure has good optical functions and has characteristics of a large aperture, a wide angle and ultra-thinness, and is especially fit for WEB camera lenses and mobile phone camera lens assemblies composed by such camera elements as CCD and CMOS for high pixels.

BRIEF DESCRIPTION OF DRAWINGS

In order to more clearly explain technical solutions in the embodiments of the present invention, the drawings required in the description of the embodiments will be briefly introduced below. Obviously, the drawings in the following description are only some embodiments of the present invention. For those of ordinary skill in the art, without making any creative efforts, other drawings can also be obtained based on these drawings, where.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
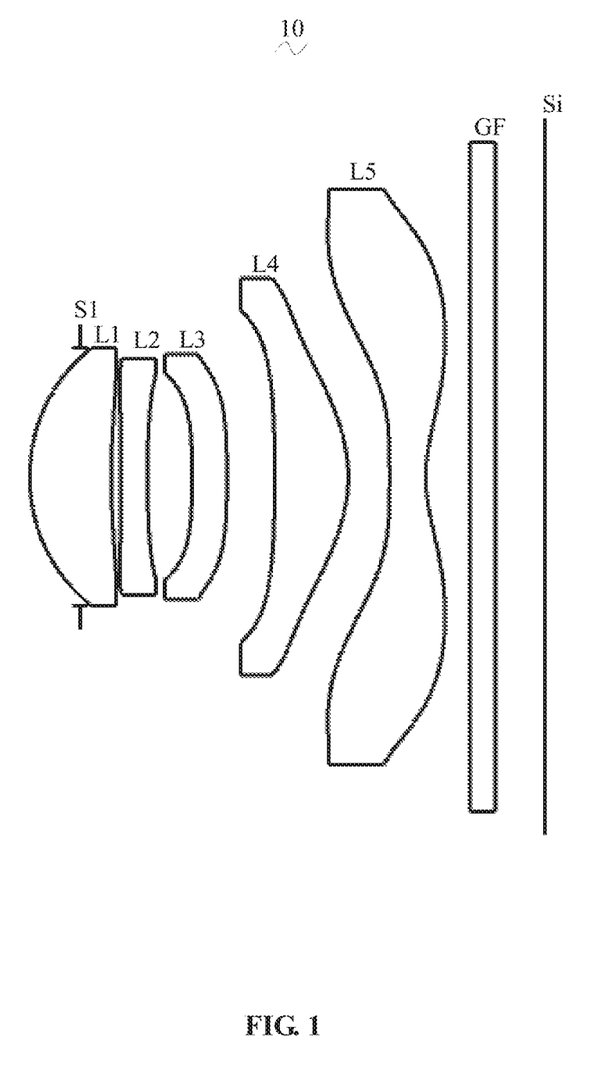
FIG. 1 is a schematic diagram of a structure of a camera optical lens according to Embodiment 1 of the present disclosure.

Please refer to the accompanying drawings, the present disclosure provides a camera optical lens 10. FIG. 1 shows a camera optical lens 10 of Embodiment 1 of the present disclosure, and the camera optical lens 10 includes fifth lenses. Specifically, the camera optical lens 10 includes, from an object side to an image side in sequence: an aperture S1, a first lens L1 having a positive refractive power, a second lens L2 having a negative refractive power, a third lens L3 having a negative refractive power, a fourth lens L4 having a positive refractive power, and a fifth lens L5 having a negative refractive power. An optical element such as an optical filter GF is arranged between the fifth lens L5 and an image surface Si.

In the embodiment, a curvature radius of an object-side surface of the second lens L2 is defined as R3, a curvature radius of an image-side surface of the second lens L2 is defined as R4, and the camera optical lens 10 satisfies the following condition: $0.60 \le (R3+R4)/(R3-R4) \le 0.7$, the condition specifies a shape of the second lens L2, within a range of which it helps correct spherical aberration and improve imaging quality.

A curvature radius of the object-side surface of the third lens L3 is defined as R5, a curvature radius of the image-side surface of the third lens L3 is defined as R6, and the camera optical lens 10 satisfies the following condition: $-5.00 \le (R5+R6)/(R5-R6) \le -4.20$, the condition specifies a shape of the third lens L3, within a range of which it helps soften refraction of light when passing through the lens, thereby effectively reducing aberration.

A curvature radius of the object-side surface of the fifth lens L5 is defined as R9, a curvature radius of the image-side surface of the fifth lens L5 is defined as R10, and the camera optical lens 10 satisfies the following condition: $0.85 \le (R9+R10)/(R9-R10) \le 0.89$, the condition specifies a shape of the fifth lens L5, within a range of which it helps balance a field curvature of the camera optical lens 10, thereby effectively improving the imaging quality.

An on-axis distance from an image-side surface of the fourth lens to an object-side surface of the fifth lens is defined as d8, and an on-axis thickness of the fifth lens L5 is defined as d9, and the camera optical lens 10 satisfies the following condition: $1.10 \le d8/d9 \le 1.20$, the condition specifies a ratio of an air gap distance between the fourth lens and the fifth lens and a thickness of the fifth lens, within a range of which it helps processing of the lenses and assembling of the camera lens.

A curvature radius of the object-side surface of the second lens L2 is defined as R3, a curvature radius of the image-side surface of the second lens L2 is defined as R4, and the camera optical lens 10 satisfies the following condition: $-5.60 \le R3/R4 \le -4.00$, the condition specifies a ratio of the curvature radius of the object-side surface of the second lens L2 and the curvature radius of the image-side surface of the second lens L2, within a range of which it helps improve optical function of the camera optical lens.

A focal length of the third lens L3 is defined as f3, a focal length of the camera optical lens 10 is defined as f, and the camera optical lens 10 satisfies the following condition: $-11.00 \le f3/f \le -9.00$, the condition being satisfied can effectively distribute the focal power of the third lens L3, correct the aberration of the camera optical lens 10, and improve the image quality.

A focal length of the first lens L1 is defined as f1, a focal length of the camera optical lens 10 is defined as f, and the camera optical lens 10 satisfies the following condition: $0.40 \le f1/f \le 1.36$, the condition specifies a ratio of the focal length of the first lens and the focal length of the camera optical lens 10, within a range of which the first lens has a suitable positive refractive power which helps reduce the aberration of the camera optical lens 10, and is beneficial for the camera optical lens 10 to develop towards a wide angle and ultra-thinness.

A curvature radius of the object-side surface of the first lens L1 is defined as R1, a curvature radius of the image-side surface of the first lens L1 is defined as R2, and the camera optical lens 10 satisfies the following condition: $-3.26 \le (R1+R2)/(R1-R2) \le -0.89$, the condition being satisfied can reasonably control a shape of the first lens L1, within a range of which it helps reduce the spherical aberration of the camera optical lens 10.

An on-axis thickness of the first lens L1 is defined as d1, a total optical length from the object-side surface of the first lens L1 to the image surface Si of the camera optical lens 10 along the optical axis is defined as TTL, and the camera optical lens 10 satisfies the following condition: $0.08 \le d1/TTL \le 0.25$, the condition being satisfied is beneficial for achieving ultra-thinness.

A focal length of the second lens L2 is defined as f2, a focal length of the camera optical lens 10 is defined as f, and the camera optical lens 10 satisfies the following condition: $-6.05 \le f2/f \le -1.42$, the condition specifies a ratio of the focal length of the second lens L2 and the focal length of the camera optical lens 10, within a range of which it helps correct the aberration of the camera optical lens 10 by controlling the negative power of the second lens L2 in a reasonable range.

An on-axis thickness of the second lens L2 is defined as d3, a total optical length from the object-side surface of the first lens L1 to the image surface Si of the camera optical lens 10 along the optical axis is defined as TTL, and the camera optical lens 10 satisfies the following condition: $0.02 \le d3/TTL \le 0.08$, the condition being satisfied is beneficial for achieving ultra-thinness.

An on-axis thickness of the third lens L3 is defined as d5, a total optical length from the object-side surface of the first lens L1 to the image surface Si of the camera optical lens 10 along the optical axis is defined as TTL, and the camera optical lens 10 satisfies the following condition: $0.03 \le d5/TTL \le 0.10$, the condition being satisfied is beneficial for achieving ultra-thinness.

A focal length of the fourth lens L4 is defined as f4, a focal length of the camera optical lens 10 is defined as f, and the camera optical lens 10 satisfies the following condition: $0.34 \le f4/f \le 1.06$, the condition being satisfied can reasonably distribute a focal power, within a range of which it helps enable the camera optical lens 10 to have better imaging quality and lower sensitivity.

A curvature radius of the object-side surface of the fourth lens L4 is defined as R7, a curvature radius of the image-side surface of the fourth lens L4 is defined as R8, and the camera optical lens 10 satisfies the following condition: $0.63 \le (R7+R8)/(R7-R8) \le 2.11$, the condition specifies a shape of the fourth lens L4, within a range of which it helps correct off-axis aberration with the development towards the wide angle and ultra-thinness.

An on-axis thickness of the fourth lens L4 is defined as d7, a total optical length from the object-side surface of the first lens L1 to the image surface Si of the camera optical lens 10 along the optical axis is defined as TTL, and the camera optical lens 10 satisfies the following condition: $0.07 \le d7/TTL \le 0.27$, the condition being satisfied is beneficial for achieving ultra-thinness.

A focal length of the fifth lens L5 is defined as f5, a focal length of the camera optical lens 10 is defined as f, and the camera optical lens 10 satisfies the following condition: $-1.22 \le f5/f \le -0.39$, the condition specifies the fifth lens, which effectively makes a light angle of the camera optical lens 10 more even, thereby reducing tolerance sensitivity.

An on-axis thickness of the fifth lens L5 is defined as d9, a total optical length from the object-side surface of the first lens L1 to the image surface Si of the camera optical lens 10 along the optical axis is defined as TTL, and the camera optical lens 10 satisfies the following condition: $0.03 \le d9/TTL \le 0.11$, the condition being satisfied is beneficial for achieving ultra-thinness.

A total optical length from the object-side surface of the first lens L1 to the image surface Si of the camera optical lens 10 along the optical axis is defined as TTL, an image height of the camera optical lens 10 is defined as IH, and the camera optical lens 10 satisfies the following condition: $TTL/IH \le 0.46$, it is beneficial for achieving ultra-thinness.

An F number of the camera optical lens 10 is defined as FNO, that is, a ratio of an effective focal length and an entrance pupil diameter, which satisfies the following condition: $FNO \le 1.66$, it is beneficial for achieving the large aperture and better image quality.

When the above conditions are satisfied, the camera optical lens 10 with good optical imaging functions can satisfy a design requirement of a large aperture, ultra-thinness and a wide angle, According to the characteristics of the camera optical lens 10, the camera optical lens 10 is especially fit for WEB camera lenses and mobile phone camera lens assemblies composed by such camera elements as CCD and CMOS for high pixels.

In the following, examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: Optical length (a total optical length from the object-side surface of the first lens L1 to the image surface Si of the camera optical lens 10 along an optical axis) in mm.

Preferably, inflexion points and/or arrest points can be arranged on the object-side surface and/or the image-side surface of the lens, so as to satisfy the demand for high quality imaging. The description below can be referred for specific implementations.

Table 1 and Table 2 list design data of the camera optical lens 10 in Embodiment 1 of the present disclosure.

TABLE 1

| | R | d | | nd | | vd | |
|---|---|---|---|---|---|---|---|
| S1 | ∞ | d0= | −0.420 | | | | |
| R1 | 1.401 | d1= | 0.681 | nd1 | 1.5444 | v1 | 55.82 |
| R2 | 5.841 | d2= | 0.081 | | | | |
| R3 | −42.846 | d3= | 0.220 | nd2 | 1.6610 | v2 | 20.53 |
| R4 | 8.592 | d4= | 0.370 | | | | |
| R5 | −8.365 | d5= | 0.289 | nd3 | 1.6610 | v3 | 20.53 |
| R6 | −13.282 | d6= | 0.401 | | | | |
| R7 | −10.668 | d7= | 0.611 | nd4 | 1.5444 | v4 | 55.82 |
| R8 | −1.200 | d8= | 0.343 | | | | |
| R9 | −17.529 | d9= | 0.300 | nd5 | 1.5236 | v5 | 55.69 |
| R10 | 1.178 | d10= | 0.374 | | | | |
| R11 | ∞ | d11= | 0.210 | ndg | 1.5168 | vg | 64.17 |
| R12 | ∞ | d12= | 0.410 | | | | |

Where: meanings of various symbols will be described as follows.

S1: aperture;

R: curvature radius of an optical surface;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of an object-side surface of the optical filter GF;

R12: curvature radius of an image-side surface of the optical filter GF;

d: on-axis thickness of a lens or on-axis distance between neighboring lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the optical filter GF;

d11: on-axis thickness of the optical filter GF;

d12: on-axis distance from the image-side surface of the optical filter GF to the image surface Si;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

Table 2 shows aspheric data of each lens of the camera optical lens 10 in Embodiment 1 of the present disclosure.

TABLE 2

| | Conic coefficient | Aspheric surface coefficients | | | | | | |
|---|---|---|---|---|---|---|---|---|
| | k | A4 | A6 | A8 | A10 | A12 | A14 | A16 |
| R1 | 3.6497E−01 | −2.8379E−02 | 1.3427E−01 | −5.8370E−01 | 1.3371E+00 | −1.7308E+00 | 1.1794E+00 | −3.3603E−01 |
| R2 | −4.2310E+01 | −4.7720E−02 | 8.2920E−02 | −2.9694E−01 | 8.6377E−01 | −1.2444E+00 | 7.9815E−01 | −1.8403E−01 |
| R3 | 9.0000E+01 | −8.8538E−02 | 1.8219E−01 | −1.0639E−01 | 5.9689E−02 | −6.1124E−02 | −2.9590E−02 | 6.4136E−02 |
| R4 | 3.7872E+01 | −3.3913E−02 | 2.3451E−01 | −6.5602E−01 | 2.3549E+00 | −5.2024E+00 | 5.7643E+00 | −2.5235E+00 |
| R5 | 8.9997E+01 | −2.1865E−01 | −2.6155E−02 | −2.2860E−01 | 5.8066E−01 | −5.9405E−01 | −3.9307E−01 | 6.7437E−01 |
| R6 | 5.2987E+01 | −1.5906E−01 | −1.7553E−01 | 5.6398E−01 | −1.3783E+00 | 2.0121E+00 | −1.6107E+00 | 5.6071E−01 |
| R7 | −7.1393E+01 | 1.6680E−02 | −1.2803E−01 | 1.7304E−01 | −1.6357E−01 | 1.0013E−01 | −3.7054E−02 | 5.9228E−03 |
| R8 | −8.8974E−01 | 1.8450E−01 | −1.9936E−01 | 1.7422E−01 | −5.7103E−02 | −4.4886E−03 | 6.2524E−03 | −9.6687E−04 |
| R9 | 5.2918E+01 | −3.1436E−01 | 2.2804E−01 | −8.7357E−02 | 2.1893E−02 | −3.5953E−03 | 3.5042E−04 | −1.5251E−05 |
| R10 | −7.3112E+00 | −1.7397E−01 | 1.2128E−01 | −5.7558E−02 | 1.7327E−02 | −3.2273E−03 | 3.3468E−04 | −1.4517E−05 |

Where: k is a conic coefficient, and A4, A6, A8, A10, A12, A14, and A16 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x \quad (1)$$

For convenience, an aspheric surface of each lens surface uses the aspheric surfaces shown in the above formula (1). However, the present disclosure is not limited to the aspherical polynomials form shown in the formula (1).

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

|  | Number(s) of inflexion points | Inflexion point position 1 | Inflexion point position 2 | Inflexion point position 3 |
|---|---|---|---|---|
| P1R1 | 1 | 1.035 | 0 | 0 |
| P1R2 | 1 | 0.705 | 0 | 0 |
| P2R1 | 1 | 0.535 | 0 | 0 |
| P2R2 | 1 | 0.835 | 0 | 0 |
| P3R1 | 0 | 0 | 0 | 0 |
| P3R2 | 1 | 0.935 | 0 | 0 |
| P4R1 | 0 | 0 | 0 | 0 |
| P4R2 | 2 | 0.915 | 1.305 | 0 |
| P5R1 | 2 | 1.155 | 2.155 | 0 |
| P5R2 | 3 | 0.465 | 2.185 | 2.405 |

TABLE 4

|  | Number(s) of arrest points | Arrest point position 1 | Arrest point position 2 |
|---|---|---|---|
| P1R1 | 0 | 0 | 0 |
| P1R2 | 1 | 0.945 | 0 |
| P2R1 | 1 | 0.765 | 0 |
| P2R2 | 0 | 0 | 0 |
| P3R1 | 0 | 0 | 0 |
| P3R2 | 0 | 0 | 0 |
| P4R1 | 0 | 0 | 0 |
| P4R2 | 0 | 0 | 0 |
| P5R1 | 2 | 2.025 | 2.225 |
| P5R2 | 1 | 1.165 | 0 |

Figure 2:
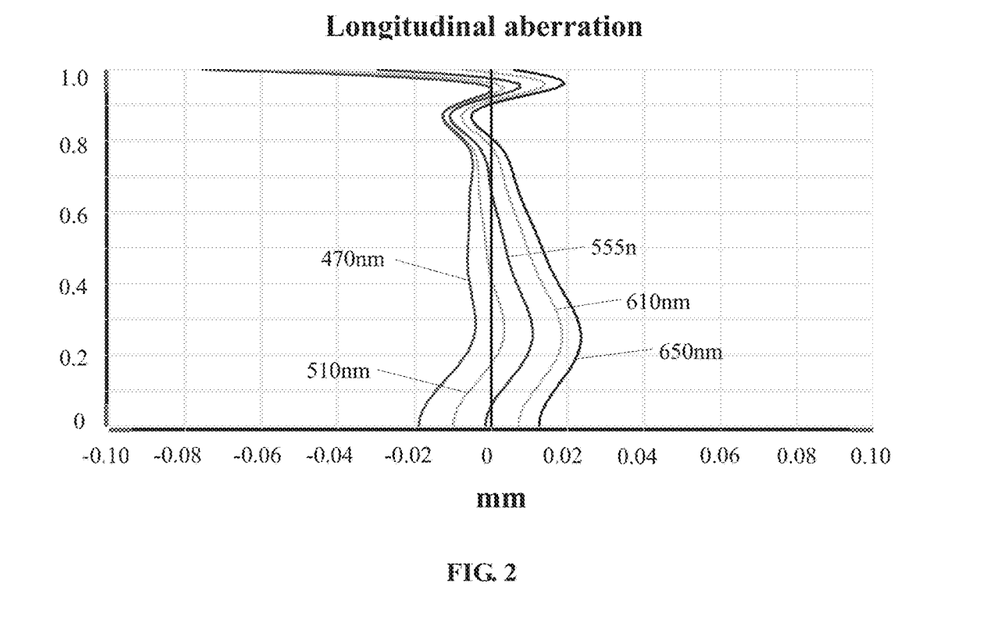
FIG. 2 is a schematic diagram of a longitudinal aberration of the camera optical lens shown in FIG. 1.
Figure 3:
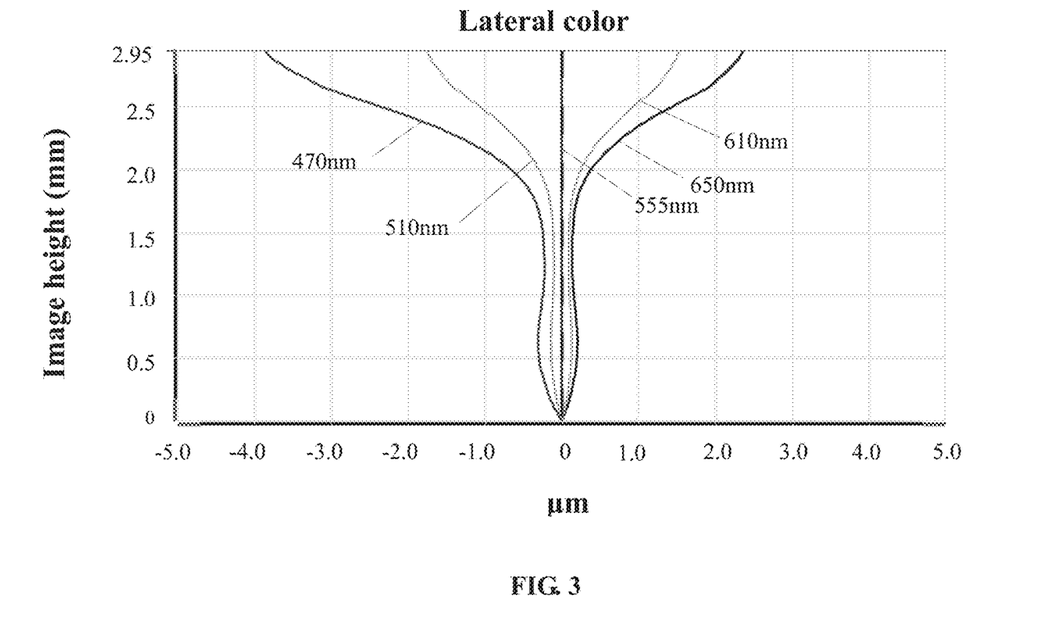
FIG. 3 is a schematic diagram of a lateral color of the camera optical lens shown in FIG. 1.
Figure 4:
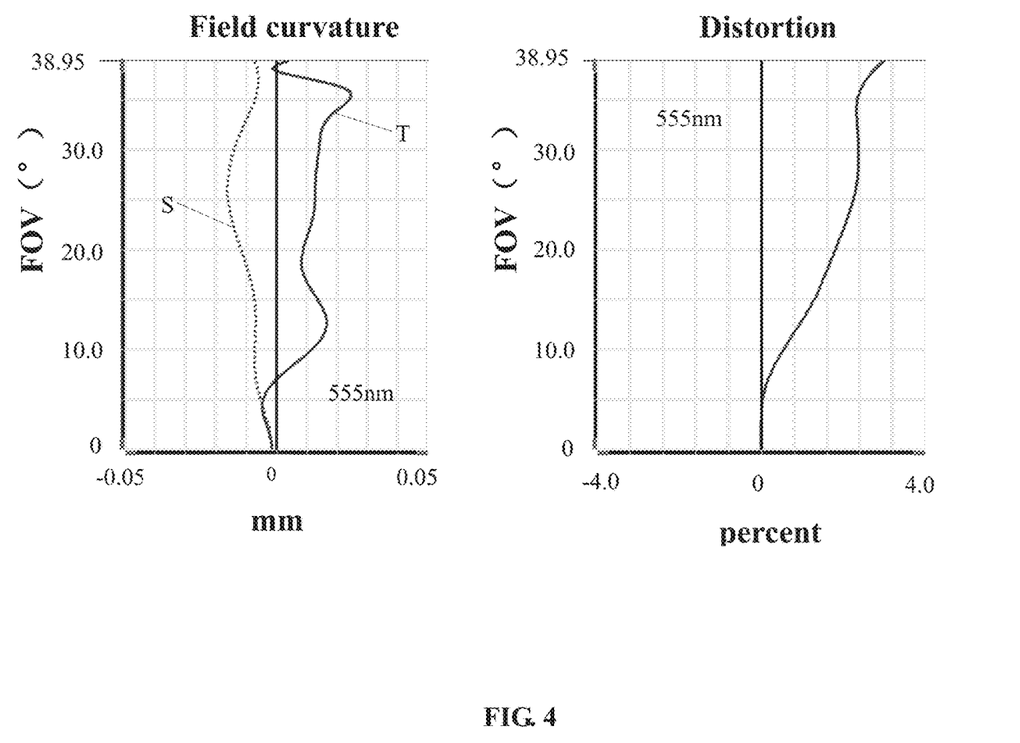
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 470 nm, 510 nm, 555 nm, 610 nm, and 650 nm after passing the camera optical lens 10 according to Embodiment 1, respectively. FIG. 4 illustrates a field curvature and a distortion of light with a wavelength of 555 nm after passing the camera optical lens 10 according to Embodiment 1. A field curvature S in FIG. 4 is a field curvature in a sagittal direction, and T is a field curvature in a tangential direction.

Table 13 in the following shows various values of Embodiment 1, 2 and 3 and values corresponding to parameters which are specified in the above conditions.

As shown in table 13, Embodiment 1 satisfies the various conditions.

In this embodiment, an entrance pupil diameter of the camera optical lens 10 is 2.145 mm, an image height of 1.0H is 2.950 mm, an FOV (field of view) in a diagonal direction is 77.90°. Thus, the camera optical lens has a wide-angle and a large aperture and is ultra-thin. Its on-axis and off-axis aberrations are fully corrected, thereby achieving excellent optical characteristics.

Embodiment 2

Figure 5:
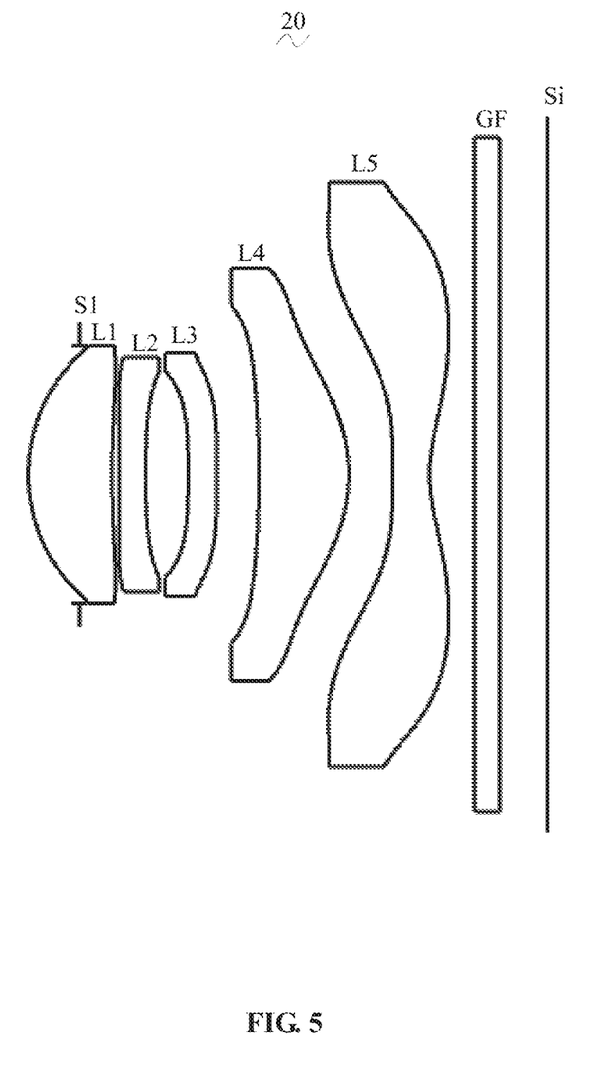
FIG. 5 is a schematic diagram of a structure of a camera optical lens according to Embodiment 2 of the present disclosure.

Embodiment 2 is basically the same as Embodiment 1 and involves symbols having the same meanings as Embodiment 1, a structure of a camera optical lens 20 according to Embodiment 2 can refer to FIG. 5, and only differences therebetween will be described in the following.

Table 5 and Table 6 show design data of a camera optical lens 20 in Embodiment 2 of the present disclosure.

TABLE 5

|  | R |  | d | nd |  | vd |
|---|---|---|---|---|---|---|
| S1 | ∞ | d0= | −0.420 |  |  |  |
| R1 | 1.377 | d1= | 0.693 | nd1 | 1.5444 v1 | 55.82 |
| R2 | 7.811 | d2= | 0.060 |  |  |  |
| R3 | −36.371 | d3= | 0.214 | nd2 | 1.6610 v2 | 20.53 |
| R4 | 6.545 | d4= | 0.356 |  |  |  |
| R5 | −7.987 | d5= | 0.236 | nd3 | 1.6610 v3 | 20.53 |
| R6 | −12.949 | d6= | 0.348 |  |  |  |
| R7 | −8.818 | d7= | 0.742 | nd4 | 1.5444 v4 | 55.82 |
| R8 | −1.213 | d8= | 0.361 |  |  |  |
| R9 | −15.685 | d9= | 0.304 | nd5 | 1.5236 v5 | 55.69 |
| R10 | 1.226 | d10= | 0.374 |  |  |  |
| R11 | ∞ | d11= | 0.210 | ndg | 1.5168 vg | 64.17 |
| R12 | ∞ | d12= | 0.390 |  |  |  |

Table 6 shows aspheric data of each lens of the camera optical lens 20 in Embodiment 2 of the present disclosure.

TABLE 6

|  | Conic coefficient | Aspheric surface coefficients | | | | | | |
|---|---|---|---|---|---|---|---|---|
|  | k | A4 | A6 | A8 | A10 | A12 | A14 | A16 |
| R1 | 4.1208E−01 | −4.1474E−02 | 1.7256E−01 | −6.4743E−01 | 1.3454E+00 | −1.7004E+00 | 1.1832E+00 | −3.5892E−01 |
| R2 | −1.6153E+01 | −5.9432E−02 | 1.2613E−01 | −3.1644E−01 | 7.9093E−01 | −1.2286E+00 | 8.9722E−01 | −2.4730E−01 |
| R3 | 8.9930E+01 | −3.1206E−02 | 1.8335E−01 | −1.8693E−01 | 9.6825E−02 | −1.6446E−02 | −4.3045E−02 | 5.9730E−02 |
| R4 | 3.2206E+01 | 3.7595E−02 | 1.3124E−01 | −5.4551E−01 | 2.3458E+00 | −5.2763E+00 | 5.7496E+00 | −2.3361E+00 |
| R5 | 8.3112E+01 | −1.6608E−01 | −1.2559E−01 | 3.2760E−02 | 3.9514E−01 | −9.0785E−01 | 3.9597E−01 | 2.7843E−01 |
| R6 | −9.0002E+01 | −1.1907E−01 | −2.4020E−01 | 7.0714E−01 | −1.4875E+00 | 1.9477E+00 | −1.4320E+00 | 4.7871E−01 |
| R7 | −9.0006E+01 | 1.3209E−02 | −1.1855E−01 | 1.9185E−01 | −1.7577E−01 | 9.9004E−02 | −3.5500E−02 | 5.8552E−03 |
| R8 | −8.2337E−01 | 1.6761E−01 | −1.9139E−01 | 1.7512E−01 | −5.4664E−02 | −5.4170E−03 | 5.8834E−03 | −8.3621E−04 |
| R9 | 4.3980E+01 | −3.1333E−01 | 2.2719E−01 | −8.7178E−02 | 2.1916E−02 | −3.6018E−03 | 3.4863E−04 | −1.4854E−05 |
| R10 | −7.4901E+00 | −1.7142E−01 | 1.2004E−01 | −5.7027E−02 | 1.7253E−02 | −3.2341E−03 | 3.3562E−04 | −1.4443E−05 |

Table 7 and table 8 show design data of inflexion points and arrest points of each lens of the camera optical lens 20 lens according to Embodiment 2 of the present disclosure.

TABLE 7

| | Number(s) of inflexion points | Inflexion point position 1 | Inflexion point position 2 | Inflexion point position 3 |
|---|---|---|---|---|
| P1R1 | 1 | 1.005 | 0 | 0 |
| P1R2 | 1 | 0.675 | 0 | 0 |
| P2R1 | 1 | 0.375 | 0 | 0 |
| P2R2 | 0 | 0 | 0 | 0 |
| P3R1 | 0 | 0 | 0 | 0 |
| P3R2 | 1 | 0.915 | 0 | 0 |
| P4R1 | 1 | 1.375 | 0 | 0 |
| P4R2 | 2 | 0.905 | 1.345 | 0 |
| P5R1 | 2 | 1.165 | 2.195 | 0 |
| P5R2 | 3 | 0.465 | 2.195 | 2.455 |

TABLE 8

| | Number of arrest points | Arrest point position 1 |
|---|---|---|
| P1R1 | 0 | 0 |
| P1R2 | 1 | 0.875 |
| P2R1 | 1 | 0.545 |
| P2R2 | 0 | 0 |
| P3R1 | 0 | 0 |
| P3R2 | 0 | 0 |
| P4R1 | 0 | 0 |
| P4R2 | 0 | 0 |
| P5R1 | 1 | 2.045 |
| P5R2 | 1 | 1.165 |

Figure 6:
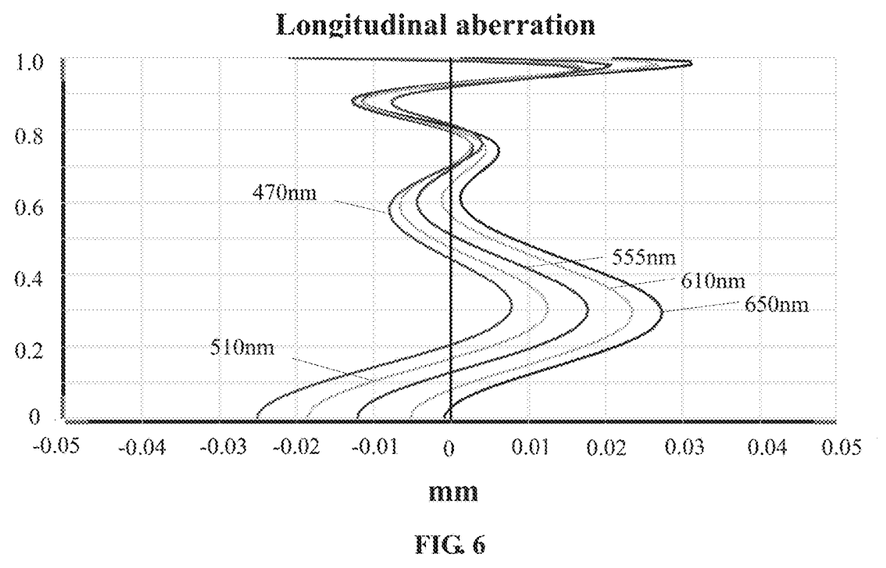
FIG. 6 is a schematic diagram of a longitudinal aberration of the camera optical lens shown in FIG. 5.
Figure 7:
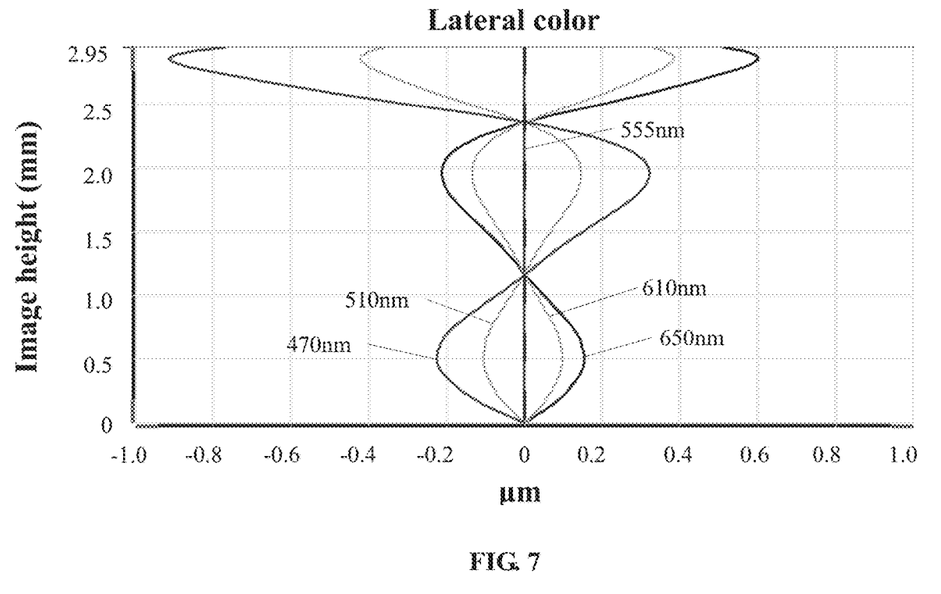
FIG. 7 is a schematic diagram of a lateral color of the camera optical lens shown in FIG. 5.
Figure 8:
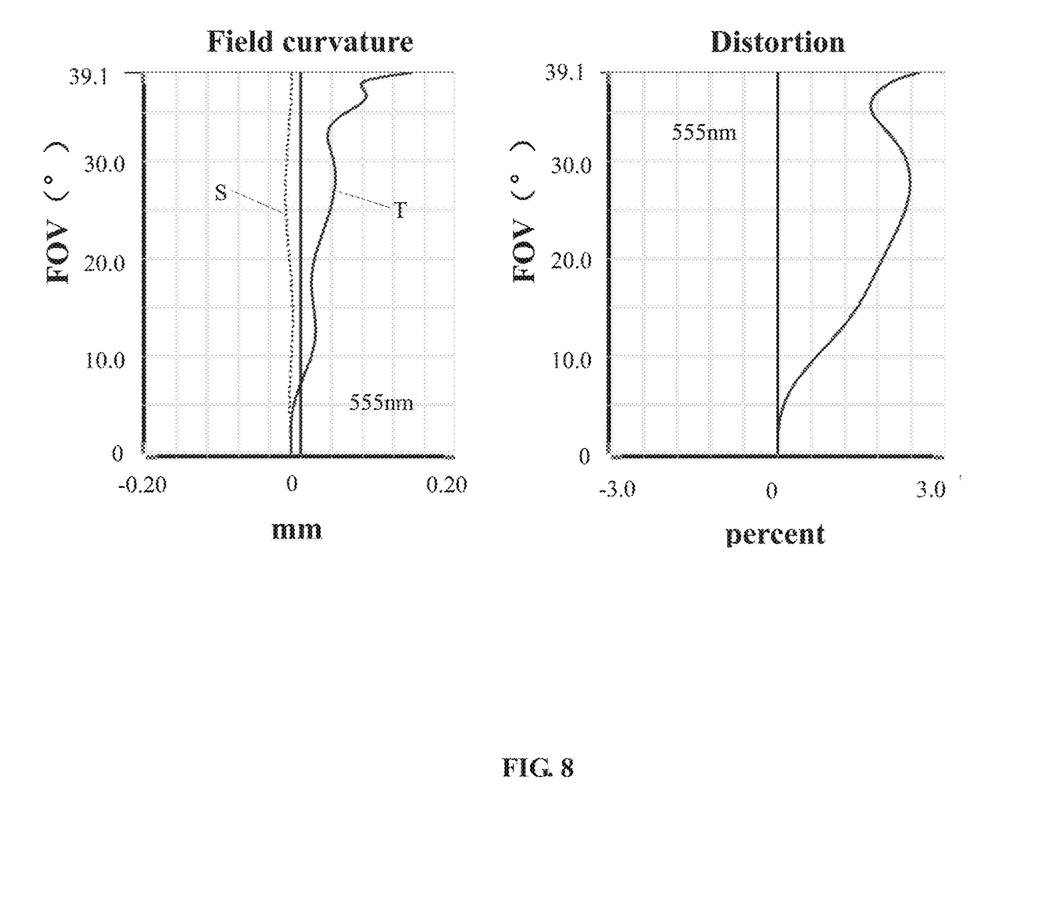
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 470 nm, 510 nm, 555 nm, 610 nm, and 650 nm after passing the camera optical lens 20 according to Embodiment 2. FIG. 8 illustrates a field curvature and a distortion of light with a wavelength of 555 nm after passing the camera optical lens 20 according to Embodiment 2. A field curvature S in FIG. 8 is a field curvature in a sagittal direction, and T is a field curvature in a tangential direction.

Table 13 in the following shows values corresponding to parameters which are specified in the above conditions of Embodiments 2. Obviously, the camera optical lens 20 of Embodiment 2 satisfies the various conditions.

In this embodiment, an entrance pupil diameter of the camera optical lens 20 is 2.134 mm, an image height of 1.0H is 2.950 mm, an FOV (field of view) in the diagonal direction is 78.20°. Thus, the camera optical lens has a wide-angle and a large aperture and is ultra-thin. Its on-axis and off-axis aberrations are fully corrected, thereby achieving excellent optical characteristics.

Embodiment 3

Figure 9:
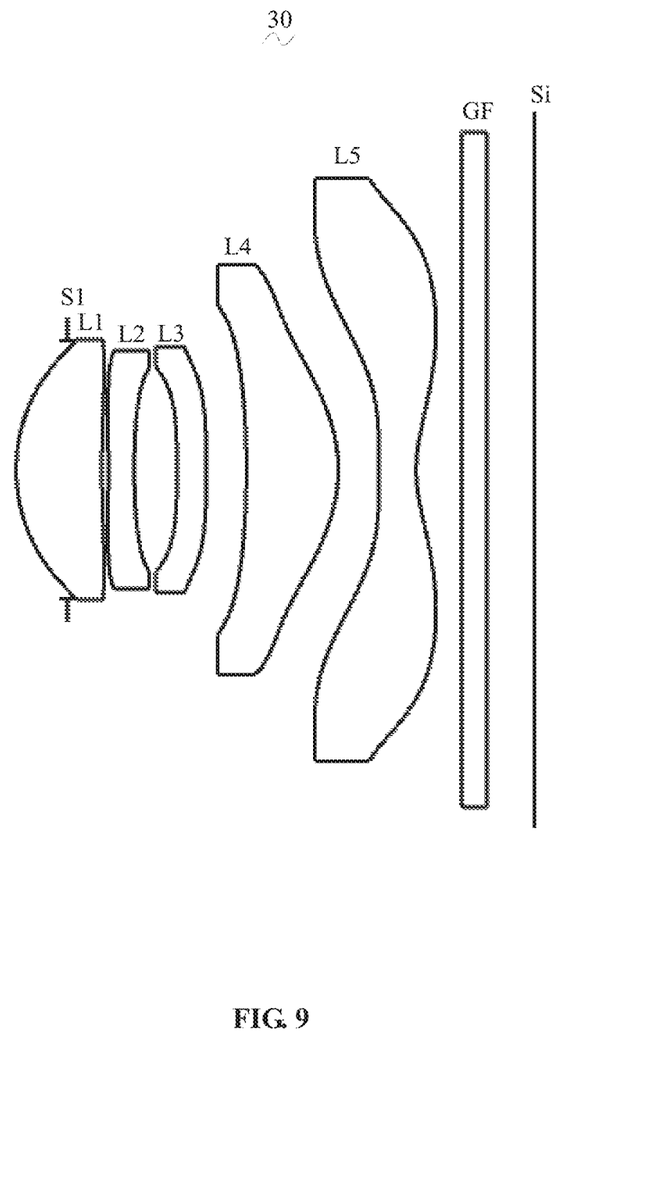
FIG. 9 is a schematic diagram of a structure of a camera optical lens according to Embodiment 3 of the present disclosure.

Embodiment 3 is basically the same as Embodiment 1 and involves symbols having the same meanings as Embodiment 1, a structure of a camera optical lens 30 according to Embodiment 3 can refer to FIG. 9, and only differences therebetween will be described in the following.

Table 9 and Table 10 show design data of the camera optical lens 30 in Embodiment 3 of the present disclosure.

TABLE 9

| | R | d | | nd | | vd |
|---|---|---|---|---|---|---|
| S1 | ∞ | d0= | −0.420 | | | |
| R1 | 1.375 | d1= | 0.709 | nd1 | 1.5444 | v1 55.82 |
| R2 | 9.721 | d2= | 0.054 | | | |
| R3 | −25.365 | d3= | 0.214 | nd2 | 1.6610 | v2 20.53 |
| R4 | 6.262 | d4= | 0.356 | | | |
| R5 | −8.480 | d5= | 0.240 | nd3 | 1.6610 | v3 20.53 |
| R6 | −12.764 | d6= | 0.332 | | | |
| R7 | −6.881 | d7= | 0.763 | nd4 | 1.5444 | v4 55.82 |
| R8 | −1.170 | d8= | 0.338 | | | |
| R9 | −19.652 | d9= | 0.305 | nd5 | 1.5236 | v5 55.69 |
| R10 | 1.177 | d10= | 0.374 | | | |
| R11 | ∞ | d13= | 0.210 | ndg | 1.5168 | vg 64.17 |
| R12 | ∞ | d14= | 0.395 | | | |

Table 10 shows aspheric data of each lens of the camera optical lens 30 in Embodiment 3 of the present disclosure.

TABLE 10

| | Conic coefficient | Aspherical surface coefficients | | | | | | |
|---|---|---|---|---|---|---|---|---|
| | k | A4 | A6 | A8 | A10 | A12 | A14 | A16 |
| R1 | 4.1524E−01 | −3.7323E−02 | 1.5328E−01 | −6.3382E−01 | 1.3594E+00 | −1.7131E+00 | 1.1645E+00 | −3.4574E−01 |
| R2 | 1.7013E+01 | −5.2328E−02 | 1.2435E−01 | −3.4207E−01 | 8.0372E−01 | −1.2113E+00 | 8.8423E−01 | −2.4608E−01 |
| R3 | −9.0000E+01 | −6.5895E−05 | 1.3459E−01 | −1.4158E−01 | 8.0212E−02 | −4.1589E−02 | 9.3035E−03 | 3.7184E−02 |
| R4 | 4.9314E+01 | 5.0611E−02 | 9.8079E−02 | −6.2987E−01 | 2.5180E+00 | −5.2303E+00 | 5.3783E+00 | −2.1354E+00 |
| R5 | 5.7157E+01 | −1.4283E−01 | −2.4914E−01 | 2.9905E−01 | 9.0095E−02 | −1.1366E+00 | 1.3030E+00 | −4.0178E−01 |
| R6 | −8.9997E+01 | −7.5360E−02 | −3.9032E−01 | 9.9606E−01 | −1.6982E+00 | 1.7987E+00 | −1.0992E+00 | 3.3096E−01 |
| R7 | −9.0016E+01 | 7.3501E−03 | −1.2932E−01 | 2.0409E−01 | −1.8202E−01 | 9.9163E−02 | −3.4615E−02 | 5.7585E−03 |
| R8 | −8.5942E−01 | 1.7733E−01 | −2.0007E−01 | 1.7198E−01 | −5.1100E−02 | −5.7533E−03 | 5.6584E−03 | −7.9715E−04 |
| R9 | 7.1307E+01 | −3.1137E−01 | 2.2365E−01 | −8.6498E−02 | 2.1981E−02 | −3.6157E−03 | 3.4488E−04 | −1.4270E−05 |
| R10 | −7.3654E+00 | −1.7113E−01 | 1.1953E−01 | −5.6957E−02 | 1.7255E−02 | −3.2347E−03 | 3.3522E−04 | −1.4383E−05 |

Table 11 and Table 12 show design data inflexion points and arrest points of the respective lenses in the camera optical lens 30 according to Embodiment 3 of the present disclosure.

TABLE 11

| | Number(s) of inflexion points | Inflexion point position 1 | Inflexion point position 2 | Inflexion point position 3 |
|---|---|---|---|---|
| P1R1 | 1 | 0.995 | 0 | 0 |
| P1R2 | 1 | 0.655 | 0 | 0 |
| P2R1 | 1 | 0.335 | 0 | 0 |
| P2R2 | 0 | 0 | 0 | 0 |
| P3R1 | 0 | 0 | 0 | 0 |

TABLE 11-continued

| | Number(s) of inflexion points | Inflexion point position 1 | Inflexion point position 2 | Inflexion point position 3 |
|---|---|---|---|---|
| P3R2 | 1 | 0.915 | 0 | 0 |
| P4R1 | 1 | 1.345 | 0 | 0 |
| P4R2 | 2 | 0.925 | 1.355 | 0 |
| P5R1 | 2 | 1.185 | 2.205 | 0 |
| P5R2 | 2 | 0.465 | 2.195 | 0 |

TABLE 12

| | Number of arrest points | Arrest point position 1 |
|---|---|---|
| P1R1 | 0 | 0 |
| P1R2 | 1 | 0.855 |
| P2R1 | 1 | 0.515 |
| P2R2 | 0 | 0 |
| P3R1 | 0 | 0 |
| P3R2 | 0 | 0 |
| P4R1 | 0 | 0 |
| P4R2 | 0 | 0 |
| P5R1 | 1 | 2.065 |
| P5R2 | 1 | 1.175 |

Figure 10:
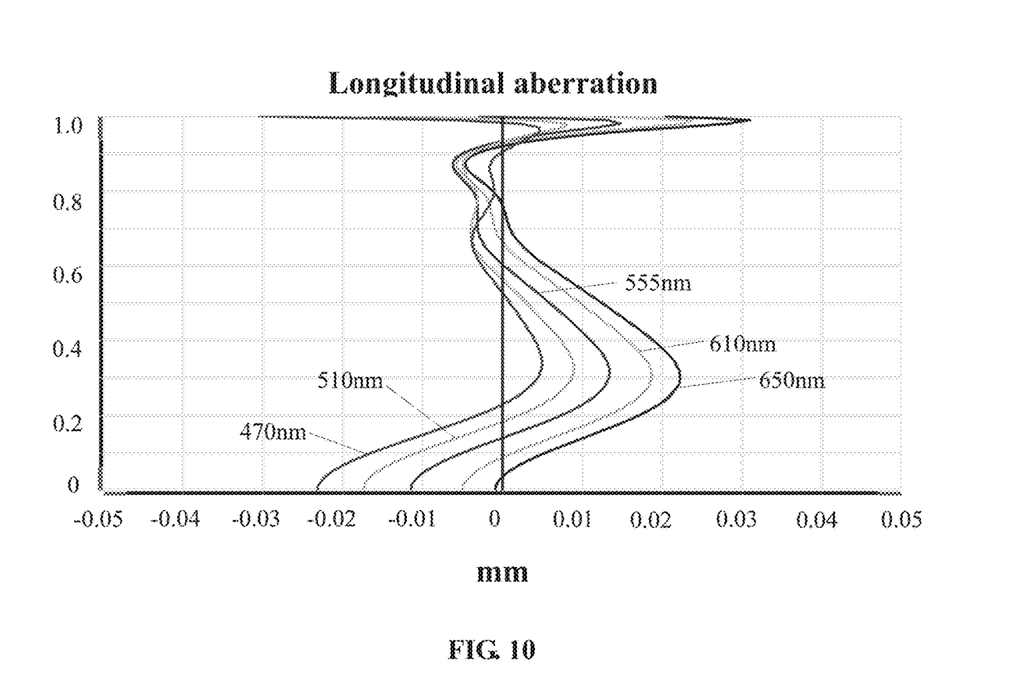
FIG. 10 is a schematic diagram of a longitudinal aberration of the camera optical lens shown in FIG. 9.
Figure 11:
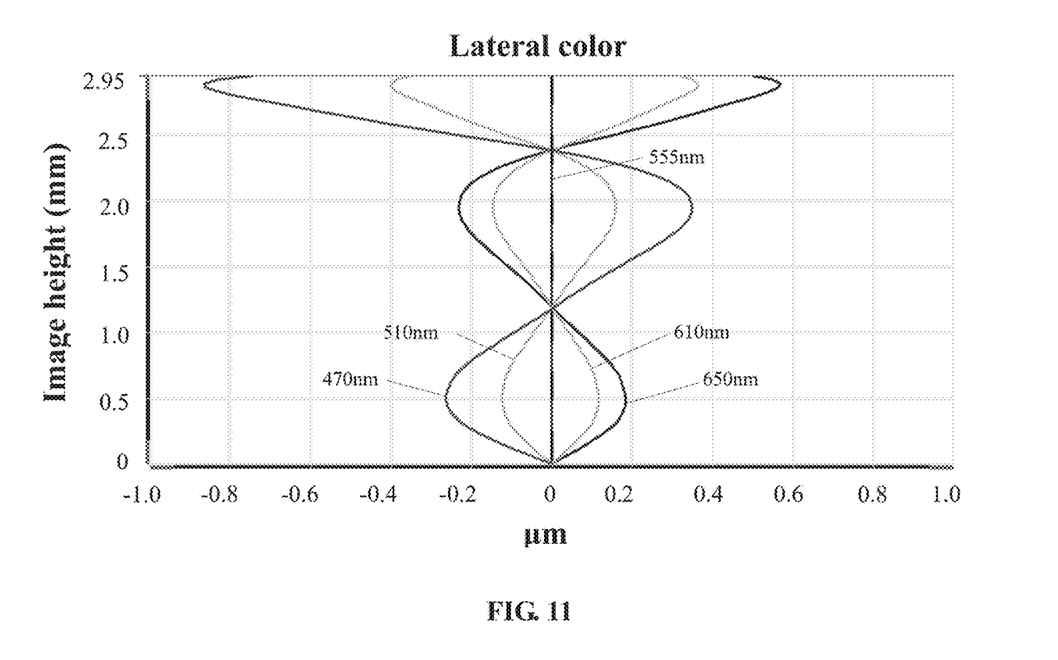
FIG. 11 is a schematic diagram of a lateral color of the camera optical lens shown in FIG. 9.
Figure 12:
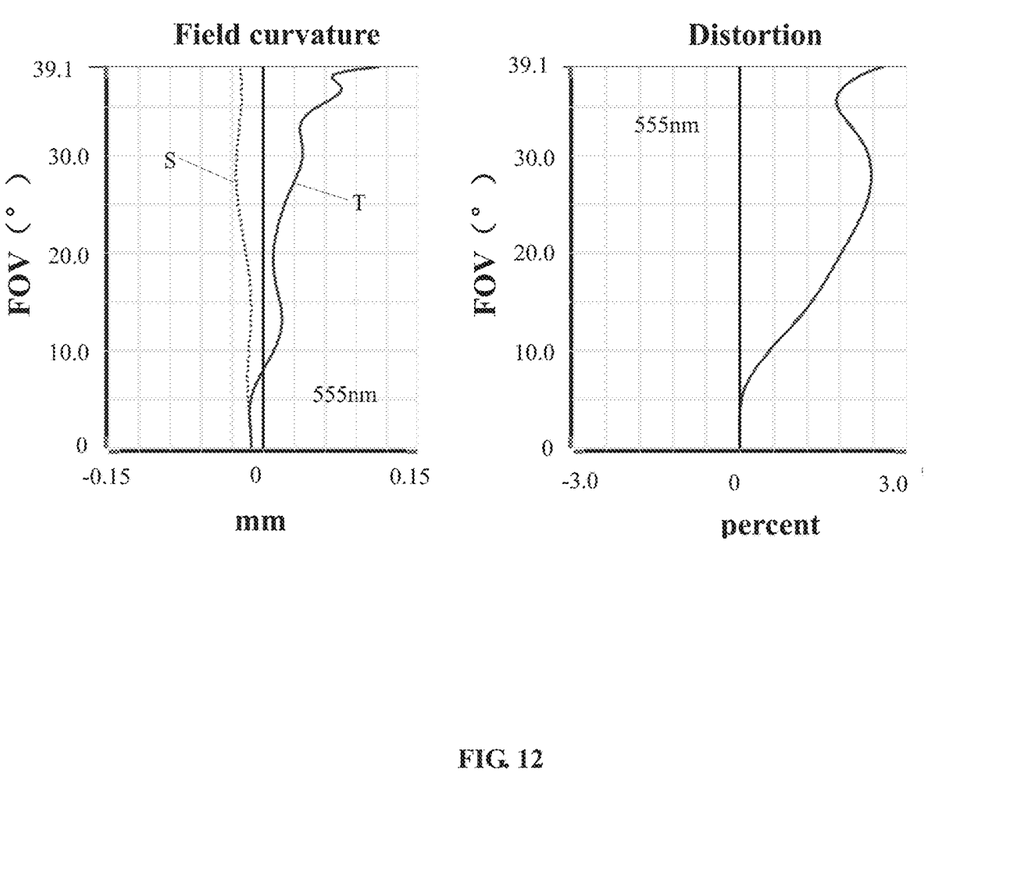
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 470 nm, 510 nm, 555 nm, 610 nm, and 650 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

Table 13 in the following shows values corresponding to parameters which are specified in the above conditions of Embodiments 3.

Obviously, the camera optical lens 30 of Embodiment 3 satisfies the various conditions.

In this embodiment, an entrance pupil diameter of the camera optical lens 30 is 2.138 mm, an image height of 1.0H is 2.950 mm, an FOV (field of view) in the diagonal direction is 78.30°. Thus, the camera optical lens has a wide-angle and a large aperture and is ultra-thin. Its on-axis and off-axis aberrations are fully corrected, thereby achieving excellent optical characteristics.

TABLE 13

| Parameters and conditions | Embodiment 1 | Embodiment 2 | Embodiment 3 |
|---|---|---|---|
| f | 3.540 | 3.520 | 3.527 |
| f1 | 3.201 | 2.949 | 2.846 |
| f2 | −10.715 | −8.302 | −7.511 |
| f3 | −34.708 | −31.860 | −38.764 |
| f4 | 2.421 | 2.489 | 2.464 |
| f5 | −2.090 | −2.151 | −2.103 |
| f12 | 4.155 | 4.051 | 4.003 |
| Fno | 1.65 | 1.65 | 1.65 |
| (R3 + R4)/(R3 − R4) | 0.67 | 0.69 | 0.60 |
| (R5 + R6)/(R5 − R6) | −4.40 | −4.22 | −4.96 |
| (R9 + R10)/(R9 − R10) | 0.87 | 0.86 | 0.89 |
| d8/d9 | 1.14 | 1.19 | 1.11 |

Where: Fno is the F number of the camera optical lens.

Those of ordinary skill in the art can understand that the above embodiments are only examples of the present disclosure. In practical applications, various changes and modifications can be made in details and forms without departing the spirits and the scope of the present disclosure.

What is claimed is:

1. A camera optical lens comprising, from an object side to an image side in sequence:
    a first lens having a positive refractive power;
    a second lens having a negative refractive power;
    a third lens having a negative refractive power;
    a fourth lens having a positive refractive power; and
    a fifth lens having a negative refractive power;
    wherein the camera optical lens satisfies following conditions:

$0.60 \leq (R3+R4)/(R3-R4) \leq 0.7$;

$-5.00 \leq (R5+R6)/(R5-R6) \leq -4.20$;

$0.85 \leq (R9+R10)/(R9-R10) \leq 0.89$; and $1.10 \leq d8/d9 \leq 1.20$;

where
    R3 denotes a curvature radius of an object-side surface of the second lens;
    R4 denotes a curvature radius of an image-side surface of the second lens;
    R5 denotes a curvature radius of an object-side surface of the third lens;
    R6 denotes a curvature radius of an image-side surface of the third lens;
    R9 denotes a curvature radius of an object-side surface of the fifth lens;
    R10 denotes a curvature radius of an image-side surface of the fifth lens;
    d8 denotes an on-axis distance from an image-side surface of the fourth lens to an object-side surface of the fifth lens;
    d9 denotes an on-axis thickness of the fifth lens.

2. The camera optical lens according to claim 1 further satisfying the following condition:

$-5.60 \leq R3/R4 \leq -4.00$.

3. The camera optical lens according to claim 1 further satisfying the following condition:

$-11.00 \leq f3/f \leq -9.00$;

where
    f3 denotes a focal length of the third lens; and
    f denotes a focal length of the camera optical lens.

4. The camera optical lens according to claim 1 further satisfying the following conditions:

$0.40 \leq f1/f \leq 1.36$;

$-3.26 \leq (R1+R2)/(R1-R2) \leq -0.89$; and $0.08 \leq d1/TTL \leq 0.25$;

where
    f1 denotes a focal length of the first lens;
    f denotes a focal length of the camera optical lens;
    R1 denotes a curvature radius of an object-side surface of the first lens;
    R2 denotes a curvature radius of an image-side surface of the first lens;
    d1 denotes an on-axis thickness of the first lens; and
    TTL denotes a total optical length from an object-side surface of the first lens to an image surface of the camera optical lens along an optical axis.

5. The camera optical lens according to claim 1 further satisfying the following conditions:

$-6.05 \leq f2/f \leq -1.42$; and $0.02 \leq d3/TTL \leq 0.08$;

where f2 denotes a focal length of the second lens;

f denotes a focal length of the camera optical lens;

d3 denotes an on-axis thickness of the second lens;

and TTL denotes a total optical length from an object-side surface of the first lens to an image surface of the camera optical lens along an optical axis.

6. The camera optical lens according to claim 1 further satisfying the following conditions:

$0.03 \leq d5/TTL \leq 0.10$;

where d5 denotes an on-axis thickness of the third lens, and

TTL denotes a total optical length from an object-side surface of the first lens to an image surface of the camera optical lens along an optical axis.

7. The camera optical lens according to claim 1 further satisfying the following conditions:

$0.34 \leq f4/f \leq 1.06$;

$0.63 \leq (R7+R8)/(R7-R8) \leq 2.11$; and $0.07 \leq d7/TTL \leq 0.27$;

where f4 denotes a focal length of the fourth lens;

f denotes a focal length of the camera optical lens;

R7 denotes a curvature radius of an object-side surface of the fourth lens;

R8 denotes a curvature radius of an image-side surface of the fourth lens;

d7 denotes an on-axis thickness of the fourth lens;

and TTL denotes a total optical length from an object-side surface of the first lens to an image surface of the camera optical lens along an optical axis.

8. The camera optical lens according to claim 1 further satisfying the following conditions:

$-1.22 \leq f5/f \leq -0.39$; and $0.03 \leq d9/TTL \leq 0.11$ where f5 denotes a focal length of the fifth lens;

f denotes a focal length of the camera optical lens;

and TTL denotes a total optical length from an object-side surface of the first lens to an image surface of the camera optical lens along an optical axis.

9. The camera optical lens according to claim 1 further satisfying the following conditions:

$TTL/IH \leq 1.46$;

where

TTL denotes a total optical length from an object-side surface of the first lens to an image surface of the camera optical lens along an optical axis; and IH denotes an image height of the camera optical lens.

10. The camera optical lens according to claim 1 further satisfying the following condition:

$FNO \leq 1.66$;

where

FNO denotes an F number of the camera optical lens.

* * * * *